June 1, 1965  R. D. LESHER ETAL  3,186,210

EXTRUSION DIE

Filed Jan. 21, 1963

INVENTORS.
ROBERT D. LESHER
CHARLES W. CLARK
RICHARD O. KONOPKA
BY
ATTORNEYS.

United States Patent Office 3,186,210
Patented June 1, 1965

3,186,210
EXTRUSION DIE
Robert D. Lesher, East Cleveland, Charles W. Clark, Berea, and Richard O. Konopka, Wickliffe, Ohio, assignors to The Cleveland Twist Drill Company, Cleveland, Ohio, a corporation of Ohio
Filed Jan. 21, 1963, Ser. No. 252,920
5 Claims. (Cl. 72—467)

This invention has to do with extrusion apparatus, particularly a die assembly for forming fluted products (such as twist drills) from high speed tool steels.

In the production of twist drills, it has long been recognized as desirable to form the drill in an extrusion die; however, where extrusion dies have been used in the past, it has been found that as a rule their forming action is variable. For one thing, the flute lead tends to increase progressively from drill to drill with increasing die wear; i.e., with decreasing bearing length. The present invention has for its principal object to obviate these and other variables, which it does (a) by increasing the length of the die block to a point where wear is largely obviated and (b) by providing a die block that is advantageously contoured, particularly at the entrance end.

One of the major advantages of the invention resides in the fact that for the first time it makes it possible to form an accurate helix by a process of extrusion. In the case of a twist drill, once it has been established that such a drill functions best with a particular flute lead; e.g., a helix of 32°, then from a commercial standpoint it is important that the drill and subsequent replicas of the drill should be uniform as to fluting. This the invention makes possible for the first time in the art of extruding twist drills. Also, if in order to enhance the accuracy of the fluting it is desired to machine the extruded drill, the invention has the important further advantage of permitting the use in the billet of a minimum amount of the needed extra stock, thus saving material.

Other objects, advantages and features of the invention will be apparent from the description which follows and from the accompanying drawings, in which.

Unless otherwise stated hereinafter, all of the components shown in FIGURES 1 to 4 are of a suitably hard metal such as a hard alloy steel.

Figure 1:
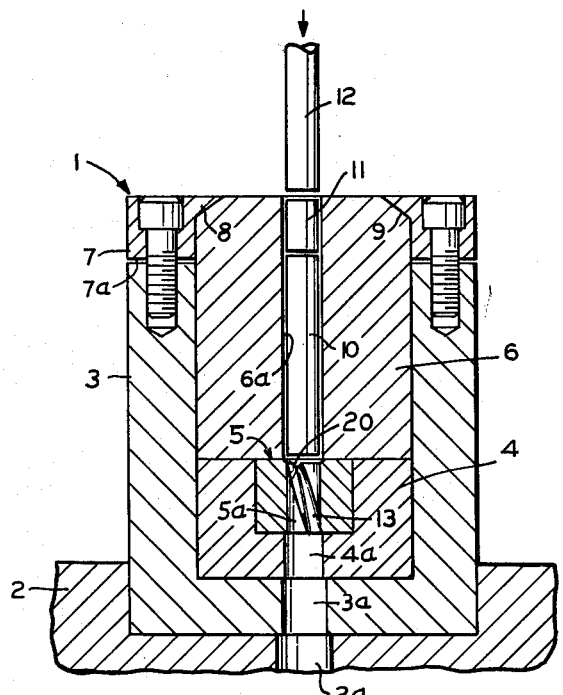
FIGURE 1 is a central vertical section through a die assembly incorporating an extrusion die of the kind to which the invention relates, such die assembly being shown on a reduced scale.

In FIGURE 1, the die assembly, designated 1, is firmly mounted in any convenient way in a shallow recess (not shown as such) in the upper face of a suitable supporting structure 2 provided with a central opening 2a. Die assembly 1 includes a cylindrically chambered housing 3, formed as shown, provided with a central bottom opening 3a. Seated at the base of the cylindrical chamber in housing 3 is a cup-shaped die holder 4 designed to serve as a receptacle for the die block, such die holder being provided with a central bottom opening 4a. Die block 5, which completely fills the hollow in receptacle 4, is generally annular in shape but provided interiorly thereof with one or more helical lands that interrupt what would otherwise be a cylindrical opening 5a at the geometrical center of the die block 5. Cylindrical opening 5a is in axial alignment with openings 2a, 3a and 4a but as regards diameter is the smallest of the group.

Resting on the plane upper end faces of die holder 4 and die block 5, which together form a flush surface, is a massive cylindrical retainer 6 that is beveled at its upper end. Retainer 6 is provided with an axial opening 6a that is in axial alignment with but of slightly greater diameter than opening 5a in die block 5. Normally, the upper end of retainer 6 engages and is engaged by a shallow annular cap 7 the lower face, 7a, of which overlies but is spaced slightly from the upper end of housing 3. Cap 7 is provided with an inwardly directed frusto-conical flange 8 that seats on the frusto-conical surface 9 formed by beveling the upper end of retainer 6. Cap screws are used as shown in FIGURE 1 to hold cap 7 rigidly in place on housing 3. Also appearing in FIGURE 1 are the billet 10 that is to be forced to, through and out of die block 5, a friable dummy block 11, and ram 12, all of cylindrical shape.

Figure 2:
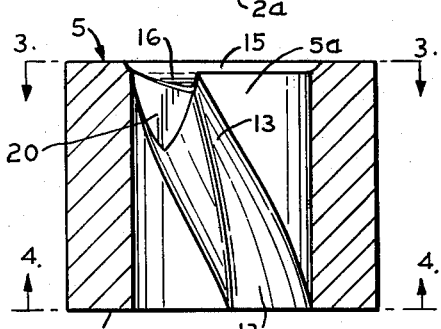
FIGURE 2 is an enlarged central vertical section through the die block.
Figure 3:
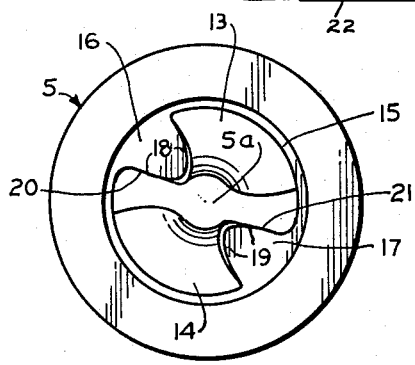
FIGURE 3 is a top plan of the die block on the same scale as FIGURE 2: see line 3—3.
Figure 4:
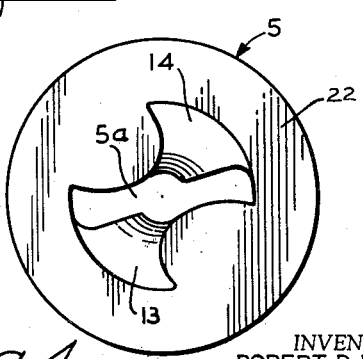
FIGURE 4 is a bottom plan of the die block: see line 4—4 of FIGURE 2.

FIGURES 1 and 2 show, on the far side of die block 5, a helical land 13 formed integrally with the die block itself. Not seen in said figures but seen in FIGURES 3 and 4 is a second helical land 14 of like dimensions that is formed integrally with die block 5 on the opposite side of opening 5a. In the preferred embodiment of the invention, the altitude of the die block, i.e., the distance separating the planes of its upper and lower end faces, is at least one-fourth the linear length of the lead characterizing helical lands 13 and 14. Differently stated, the helical lead of lands 13 and 14, measured linearly, is not more than four times the length of the die block, measured from end to end. As a result, the die block of the present invention is relatively long in comparison with those of the prior art.

Where the above-described relationships obtain, the dimensions of the lands and particularly the helical leads of the lands (and thus the helical leads of the flutes in the the extrusions) do not change materially but tend to remain substantially the same notwithstanding long-continued use of the die block; in other words, the effect of wear is minimized and for practical purposes eliminated. In the case of die blocks made of standard hot work die steels, the one-to-four relationship may be considered to be critical, for the results of experiments wherein a given die block is shortened periodically establish that the shape of the lands in the die block does not change materially until after the die block has been reduced in length to something less than one fourth of the linear length of the helical lead of its lands. When the die block is shorter than one-fourth, the shape of the lands tends to change progressively in such a way as to bring about an increase in the flute lead of the product, thus making for non-uniformity.

Using heated billets of high speed tool steel, friable dummy blocks and die blocks of standard hot work die steels provided with openings measuring from one-half to five-eights inch in diameter and 32° lead angles in the lands, it has been found that when the above-described relationships obtain as between the altitude of the die block and the helical lead of the lands, measured linearly, a greatly reduced rate of die block wear is obtained, even at pressures up to 165,000 p.s.i., as compared with that obtained with otherwise similar die blocks wherein the guide lengths are relatively short. So long as the reduction in cross-sectional area during extrusion is less than 20 to 1, the greater guide lengths provided by the present invention tend to overcome the effects of speed variations in ram 12, to compensate for uneven frictional factors in the die block itself, and to make for extrusions with more accurately formed flutes.

As can be seen from FIGURE 2, the upper end of die block 5 is countersunk in such a way as to form a curved surface 15 providing a smoothly contoured entrance to opening 5a. Where lands 13 and 14 adjoin such entrance, surface 15 is faired into end faces 16 and 17 on the proximate ends of the lands. To make for optimum fairing, end faces 16 and 17 are made tangent to the radius defining curved surface 15. Also, end faces 16 and 17 are cut away or relieved along their lateral edges as indicated at 18 and 19 (FIGURE 3). The edge reliefs so formed, while not strictly necessary, tend to facilitate entry of the leading end of the billet into opening 5a by eliminating what might otherwise be undesirably sharp edges on the ends of the lands.

From FIGURE 2 it can further be seen that land 13 is provided with a flat U-shaped or generally triangular relief 20 that extends downward from the left hand edge of end face 16, seen as in FIGURE 2, in a direction paralleling the longitudinal axis of the die block. Being flat, relief 20 appears in FIGURE 3 only as a line, as does a similar relief 21 extending downward from the corresponding edge of end face 17 on land 14. With or without edge reliefs 18 and 19, downwardly extending reliefs 20 and 21 contribute greatly to the satisfactory operation of the die block. They eliminate what would otherwise be troublesome shoulders or shelves forming part of lands 13 and 14 at the upper end of opening 5a.

It will also be observed from FIGURE 2 that neither edge reliefs nor axial reliefs are employed at the lower or exit end 22 of the die block, which end is not countersunk or otherwise contoured but left flat.

Using the present invention, it thus becomes possible, by a simple extrusion process, to produce fluted products wherein the lead angle is particularly accurate, usually within one-half degree. As compared with prior extrusion procedures, a much improved straightness of the product results from the greater bearing length of the die block. For the reason that the wear must proceed along the entire bearing length before a dimensional change occurs in the product, the latter has a longer service life. Tearing of the product in the die block is reduced to negligible proportions. Thus the invention has important practical advantages.

The die design shown as illustrative of the invention in FIGURE 2 of the accompanying drawings was evaluated using a variety of standard hot work die steels such as H-11 and H-13: for the metallurgical compositions of these steels see pages 745 to 751 of Vol. I of the 8th edition (1961) of the Metals Handbook of the American Society for Metals. It was further evaluated utilizing as die materials molybdenum-tungsten high speed steel, sintered metal carbides, and various Stellite alloys. The invention was found to be operable without regard to the choice of die material so long as such material had adequate strength and adequate resistance to abrasive wear. With this in mind, it will be evident to those skilled in the art that a wide variety of die materials is likely to be suitable for the purpose. It will also be evident that the dummy block, if one is used, may be of any of various friable materials that are commercially available, including compressed carbon, molybdenum disulphide, glass and the like. Numerous other changes within the skill of those versed in the art may be made without departing from the spirit of the invention.

It is intended that the patent shall cover, by suitable expression in the appended claims, all features of patentable novelty residing in the invention.

What is claimed is:

1. An extrusion die comprising a block formed with a central opening extending axially from one end thereof to the other, such opening being interrupted by at least one helical land but being otherwise generally cylindrical in shape; a countersunk entrance leading to said opening, the countersunk portion thereof being faired into the surface defining the proximate end of the land; and a flat, generally U-shaped relief extending along one side of the land from a zone adjacent said countersunk entrance in a direction paralleling the central axis of said opening.

2. An extrusion die comprising a block formed with a central opening extending axially from one end thereof to the other, such opening being interrupted by at least one helical land but being otherwise generally cylindrical in shape; a countersunk entrance leading to said opening, the countersunk portion thereof being faired into the surface defining the proximate end of the land; edge reliefs on the portions of the land adjacent said surface; and a flat, generally U-shaped relief extending in an axial direction along one side of the land from one of said edge reliefs.

3. An extrusion die according to claim 1 in which the lead of the land is not more than four times the length of the die block.

4. An extrusion die according to claim 2 in which the lead of the land is less than four times the length of the die block.

5. An extrusion die according to claim 4 in which the reduction in cross-sectional area is less than 20 to 1.

References Cited by the Examiner

UNITED STATES PATENTS

| 2,639,809 | 5/53 | Perry et al. | 207—10 |
| 2,673,645 | 3/54 | Moczik | 207—17 |
| 2,764,042 | 9/56 | Gotze | 207—17 |
| 2,907,454 | 10/59 | Sejournet | 207—17 |
| 3,112,828 | 12/63 | Zipf | 207—10 |

FOREIGN PATENTS

| 545,185 | 4/32 | Germany. |
| 577,134 | 4/35 | Germany. |
| 1,048,550 | 1/59 | Germany. |

MICHAEL V. BRINDISI, *Primary Examiner.*

ROBERT F. WHITE, *Examiner.*